United States Patent
Qi et al.

(10) Patent No.: US 7,774,014 B2
(45) Date of Patent: Aug. 10, 2010

(54) REDUCING CALL DROPS IN SPREAD SPECTRUM WIRELESS COMMUNICATION SYSTEMS

(75) Inventors: Bi Qi, Morris Plains, NJ (US); Yang Yang, Parsippany, NJ (US); Lily H. Zhu, Parsippany, NJ (US)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 764 days.

(21) Appl. No.: 11/213,656

(22) Filed: Aug. 26, 2005

(65) Prior Publication Data

US 2007/0049318 A1     Mar. 1, 2007

(51) Int. Cl.
*H04W 52/20* (2009.01)
*H04W 52/40* (2009.01)
*H04W 36/18* (2009.01)

(52) U.S. Cl. .................. 455/522; 455/442; 455/525
(58) Field of Classification Search .......... 455/522, 455/13.3
See application file for complete search history.

(56) References Cited

U.S. PATENT DOCUMENTS

| | | | |
|---|---|---|---|
| 5,548,812 A * | 8/1996 | Padovani et al. | 455/442 |
| 5,884,187 A * | 3/1999 | Ziv et al. | 455/522 |
| 6,397,043 B1 * | 5/2002 | Kang | 455/69 |
| 2001/0011018 A1 * | 8/2001 | Baum et al. | 455/442 |
| 2003/0032439 A1 * | 2/2003 | Harris et al. | 455/517 |
| 2004/0132476 A1 * | 7/2004 | Lundby et al. | 455/522 |
| 2005/0201332 A1 * | 9/2005 | Bakshi et al. | 370/333 |
| 2007/0160025 A1 * | 7/2007 | Lee et al. | 370/342 |

OTHER PUBLICATIONS

Jin Yu, et al. "Reverse Link Capacity of Power-Controlled CDMA Systems with Antenna Arrays In a Multipath Fading Environment"—Mitsubishi Electric Research Laboratories, Inc., IEEE, GLOBECOM, 2003.

Sneha K. Kasera, et al. "Congestion Control Policies for IP-based CDMA Radio Access Networks"—Bell Laboratories, Lucent Technologies, IEEE, INFOCOM, 2003.

\* cited by examiner

*Primary Examiner*—Philip J Sobutka
(74) *Attorney, Agent, or Firm*—Williams, Morgan & Amerson, PC

(57) ABSTRACT

The present invention provides a method and an apparatus of wireless communication with at least one wireless unit. The method includes detecting an indication of error in a plurality of traffic frames to control transmit power between at least a first and second forward link based on the indication of error. The method further includes receiving a plurality of consecutive traffic frames over at least two reverse links from a wireless unit to select a frame in soft handoff. To control transmit power, for example, a controller may perform reverse link error detection after frame selection. The controller detects a frame error to boost the transmit power, substantially correcting a link imbalance situation. In this way, by controlling transmit power in a spread spectrum wireless communication system to reduce call drops, a call drop rate may be significantly decreased while increasing capacity of radio frequency transmission.

6 Claims, 4 Drawing Sheets

REDUCING CALL DROPS IN SPREAD SPECTRUM WIRELESS COMMUNICATION SYSTEMS

FIELD OF THE INVENTION

This invention relates generally to telecommunications, and more particularly, to wireless communications.

DESCRIPTION OF THE RELATED ART

Wireless communications systems or mobile telecommunication systems typically provide different types of services to different users or subscribers of wireless communication devices. The wireless communication devices may be mobile or fixed units and situated within a geographic region across one or more wireless networks. The users or subscribers of wireless units or communication devices, such as mobile stations (MSs) or access terminals or user equipment may constantly move within (and outside) particular wireless networks. A wireless unit may encompass additional features and applications than typically available on a conventional cellular phone. Examples of different features and applications include e-mail service, Internet access, audio-video interfaces for music and media content streaming.

A wireless communications system generally includes one or more base stations (BSs) that can establish wireless communications links with wireless units. Each wireless unit has an active set, which comprises a set of base stations with which it may communicate. Base stations may also be referred to as node-Bs or access networks. To form the wireless communications link between a wireless unit and a base station, the wireless unit accesses a list of available channels (or carriers) broadcast by the base station. To this end, a wireless communications system, such as a spread spectrum wireless communications system, may allow multiple users to transmit simultaneously within the same wideband radio channel, enabling a frequency re-use based on a spread spectrum technique.

Base stations may be added to, or removed from, the active set depending on the quality of communications with the base station. An active set is a group of base stations that are supporting a call simultaneously, for example, on a Forward and Reverse Fundamental Channel (F/R-FCH). For example, a wireless unit may determine that the quality of service of a first forward link from a first base station on a forward pilot channel has deteriorated and may therefore transmit a request, over the available reverse links to remove the first base station from the active set. The base station that is acting as a serving base station may then forward a response message to the wireless unit over the forward link. Similarly, the wireless unit may request that a second base station be added to the active set.

In many cellular networks, higher data rates and stringent Quality of Service (QoS) requirements demand an improved management of radio resources, such as transmit power. For many reasons, including desired functioning of a Code Division Multiple Access (CDMA) system, power control is generally provided. In the absence of power control, the capacity of the CDMA system may be reduced and battery life of a wireless unit may be depleted due to wastage of the wireless unit's transmitter power.

Power control is generally desired on both base stations and wireless units to provide an ability to adjust transmit power dynamically or in real-time within CDMA systems. For example, on a forward link, transmitter power is generally minimized to maximize the system capacity. On a reverse link, the wireless unit's transmitter power is generally minimized for a longer battery life and to lower interference. Without such power control, wireless units may transmit signals toward a base station with the same power regardless of fading and a distance from the base station, which may cause unnecessary interference to the system.

Without power control, wireless units that are closer to the base station may cause significant interference to the wireless units that are further away from the base station because of non-zero cross-correlation between signature sequences assigned to users. This phenomenon is sometimes referred to as a near/far effect. Therefore, power control is provided on the reverse link to mitigate the near/far effect. In an IS-95 standard based system, however, power control techniques for reverse and forward links compromise between ease of implementation and performance.

Likewise, transmit power control in some 2nd Generation (2G) standard compliant wireless communication systems is effected using network synchronization to synchronize the power transmitted by different legs. This synchronization enhances the power control gains to provide desired transmit power control. In some 3rd Generation (3G) standard compliant wireless communication systems, transmit power control implementation, instead of the network synchronization, a down bias technique is used to avoid power imbalance among the legs and to avoid waste of power on a weak leg. In general, such a down bias is intended for legs that are not useful in the reverse link. However, the down bias may be applied to useful legs which have relatively strong forward link but weak reverse link (e.g., link imbalance is present), resulting in undesired or unintended call drops.

In one case where the dominant forward link is so weak that the wireless unit receives twelve consecutive frames in error, a popular CDMA standard, IS-95, mandates that the wireless unit turn off the transmitter. As a result, the base station will not be able to correctly decode any frames on the reverse link. If the base station fails to respond appropriately to this condition, at least two undesirable scenarios may occur. In the first scenario, if the base station reduces the transmit power, and the base station is the dominant leg in the call, the call is dropped, which leads to an increased call drop rate.

Alternatively, if the base station continues to increase the transmit power without being the controlling leg of the call, power is wasted at the base station. The wasted power increases interference in the wireless communication system without providing any improvement in the call drop situation. Moreover, a decrease in system capacity with no effect on the call drop rate may result.

SUMMARY OF THE INVENTION

The following presents a simplified summary of the invention in order to provide a basic understanding of some aspects of the invention. This summary is not an exhaustive overview of the invention. It is not intended to identify key or critical elements of the invention or to delineate the scope of the invention. Its sole purpose is to present some concepts in a simplified form as a prelude to the more detailed description that is discussed later.

The present invention is directed to overcoming, or at least reducing, the effects of one or more of the problems set forth above.

In one embodiment of the present invention, a method wireless communication with at least one wireless unit. The method includes detecting an indication of error in a plurality of traffic frames to control transmit power between at least a first and a second forward link based on the indication of error.

BRIEF DESCRIPTION OF THE DRAWINGS

The invention may be understood by reference to the following description taken in conjunction with the accompanying drawings, in which like reference numerals identify like elements, and in which.

Figure 1:
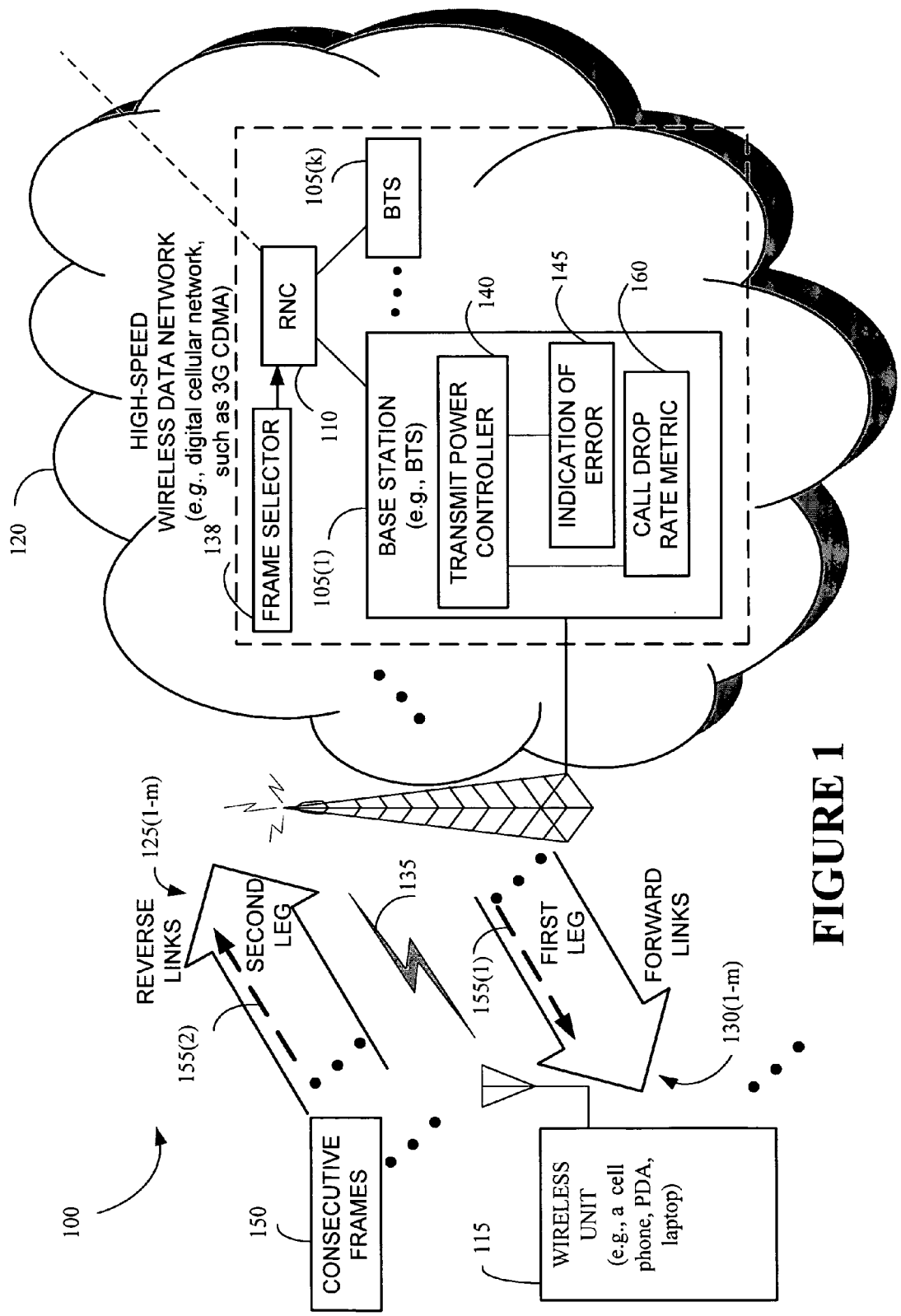
FIG. 1 illustrates a spread spectrum wireless communications system that includes a first and a second base station to control transmission power for reducing power imbalance across forward and reverse links according to one illustrative embodiment of the present invention.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DETAILED DESCRIPTION OF SPECIFIC EMBODIMENTS

Illustrative embodiments of the invention are described below. In the interest of clarity, not all features of an actual implementation are described in this specification. It will of course be appreciated that in the development of any such actual embodiment, numerous implementation-specific decisions may be made to achieve the developers' specific goals, such as compliance with system-related and business-related constraints, which will vary from one implementation to another. Moreover, it should be appreciated that such a development effort might be complex and time-consuming, but may nevertheless be a routine undertaking for those of ordinary skill in the art having the benefit of this disclosure.

Generally, a method and an apparatus are provided for wireless communication with at least one wireless unit. The method includes receiving a plurality of traffic frames over at least two reverse links from a wireless unit to select a frame in soft handoff. The method further includes detecting an indication of error in the received plurality of traffic frames to control transmit power between at least a first and second forward link based on the indication of error. A controller disposed at a base station may intelligently change the base station transmit power based on frame detection over a reverse link. The controller may perform reverse link error detection after frame selection. The controller may detect a frame error to boost the transmit power, correcting a link imbalance situation. The controller may determine whether a leg with a bad reverse link is the dominant leg on the forward link and responds accordingly. The controller may provide a forward link power control, such as for over an air interface high-speed wireless packet data calls using third-generation (3G) code division multiple access (CDMA) 1×(3G1X) and Universal Mobile Telecommunications Systems (UMTS) wireless communication systems to reduce call drop rates. In this way, by controlling transmit power in a spread spectrum wireless communication system a call drop rate may be significantly decreased while increasing capacity of radio frequency transmission.

Referring to FIG. 1, a spread spectrum wireless communications system 100 is illustrated to include to first and second base stations (BSs) 105(1-$k$) that may control transmit power according to one illustrative embodiment of the present invention. The first and second base stations 105(1-$k$) may provide the wireless connectivity according to any desirable protocol including a Code Division Multiple Access (CDMA, cdma2000) protocol, a Universal Mobile Telecommunication System (UMTS) protocol, and like.

The first and second base stations 105(1-$k$) may be coupled to a radio network controller (RNC) 110. The radio network controller 110 may manage relocation of one or more scrambling codes for communicating with a wireless unit, such as a (MS) 115 according to one illustrative embodiment of the present invention. Although two base stations 105(1-$k$) and one radio network controller 110 are shown in FIG. 1, persons of ordinary skill in the pertinent art having benefit of the present disclosure should appreciate that any desirable number of base stations 105 and radio network controller 110 may be used.

Each of the first and second base stations 105(1-$k$), e.g., base transceiver stations (BTSs), may provide connectivity to associated geographical areas within a relatively high-speed wireless data network 120. Although the high-speed wireless data network 120 is shown to include the first and second base stations 105(1-$k$) coupled to the radio network controller 110 in FIG. 1, persons of ordinary skill in the art should appreciate that portions of the high-speed wireless data network 120 may be suitably implemented in any number of ways to include other components using hardware, software, or a combination thereof. High-speed wireless data networks are known to persons of ordinary skill in the art and so, in the interest of clarity, only those aspects of the high-speed wireless data network 120 that are relevant to the present invention will be described herein.

One example of the high-speed wireless data network 120 includes a digital cellular network. More specifically, the 3rd Generation Partnership Project (3GPP) and the 3rd Generation Partnership Project 2 (3GPP2) specifications for a code division multiple access (CDMA) Universal Mobile Telecommunications Systems (UMTS) defines a uplink or reverse link channel that uses a set of specific sequences in spread spectrum systems, such as a based on a CDMA protocol. Examples of the wireless unit 115 may include a host of wireless communication devices including, but not limited to, cellular telephones, personal digital assistants (PDAs), and global positioning systems (GPS) that employ the spread spectrum communications system 100 to operate in the high-speed wireless data network 120, such as a digital cellular CDMA network. Other examples of the wireless unit 115 may include smart phones, text messaging devices, and the like.

In the spread spectrum wireless communications system 100, mobile communications between the first and second base stations 105(1-$k$) and the wireless unit 115 may occur over an air interface 135 via a radio frequency (RF) medium that uses a code division multiple access (CDMA) protocol to support multiple users. When moving within the high-speed wireless data network 120, such as a digital cellular CDMA network, a handover of mobile communications occurs for the wireless unit 115 upon a user leaving an area of responsibility of a first cell, namely, into a new cell. This handover may be coordinated by the radio network controller 110.

Consistent with one embodiment, in soft handoff (SHO), the wireless unit 115 may transmit messages to the first base station 105(1) over a first reverse link 125(1) and to the second base station 105(k) over a second reverse link 125(2). A first forward link 130(1) may provide messages to the wireless unit 115 from the first base station 105(1) and a second forward link 130(2) may provide messages to the wireless unit 115 from the second base station 105(k).

The messages may include traffic packets and signaling messages. Traffic packets, which are sometimes referred to as data packets, include information that is intended for the user of the wireless unit 115. For example, traffic packets may include voice information, images, video, data requested from an Internet site, and the like. In contrast, signaling messages are used to provide information intended to be used by the wireless unit 115 and/or other elements of the spread spectrum wireless communications system 100. For example, signaling messages may include data rate messages, configuration messages, setup instructions, switch instructions, handoff instructions, and the like.

The wireless unit 115 may transmit messages or signals to one or more active base stations using one or more associated reverse links. Pseudo noise offsets (PN offsets) associated with each of the active base stations are included in an active set list, which is typically stored by the radio network controller 110 coupled to the first and second base stations 105(1-k). The wireless unit 115 may receive messages and/or signals over the forward link 130 between the wireless unit 115 and all of the active base stations.

The wireless unit 115 may request a handoff by sending a signaling message, such as a pilot strength measurement message (PSMM) to the radio network controller 110. For example, the wireless unit 115 may request that the second base station 105(k) be added to, or removed from, an active set list maintained in the radio network controller 110. A handoff direction message (HDM) may be sent on all the legs involved in the soft handoff. For example, a handoff direction message is transmitted over the all the forward links 130(-m). In other words, all the base stations 105 in the active set of the wireless unit 115 send the handoff direction message.

A soft handoff feature of the spread spectrum wireless communications system 100, such as a CDMA wireless communications systems enables the wireless unit 115 to stay within range of at least one base station 105 across overlapping coverage zones referred to as cells of base stations. Using this soft handoff feature, the wireless unit 115 may communicate simultaneously to two or more cells, or in some cases with two sectors on the same cell. This often happens when the wireless unit 115 is about halfway between the cells or on the dividing line between sectors, and permits the call to continue even though the signal from any one cell would not be strong enough to keep the call up. In this way, the wireless unit 115 may transmit signals to, and receive signals from, more than one base station 105 at a time.

In general, when the wireless unit 115 transmits a plurality of consecutive traffic frames 150, both the first and second base stations 105(1-k) may attempt to decode the frames 150 from the wireless unit 115 on an associated reverse link. For example, the first base station 105(1) decodes the frames 150 from the wireless unit 115 on the first reverse link 125(1). However, individual reverse link RF conditions for the first and second base stations 105(1-k) may vary. That is, one base station may receive a frame from the wireless unit 115 without an error while another base station may receive the same frame with an error. The base station that receives the frame with an error on a reverse link may either have a relatively strong forward link or a relatively weak forward link. For example, the first reverse link 125(1) to the first base station 105(1) may be a weak reverse link while the forward link 130 may be a strong forward link.

In soft handoff (SHO), a frame selector 138 at the radio network controller 110 examines the received frames from the first and the second base stations 105(1-k). During the soft handoff, the wireless unit 115 communicates with more than one base station simultaneously. When in soft-handoff, the wireless unit 115 receives multiple frames on the forward link 130, sometimes referred to a downlink. On the reverse link 125, sometimes referred to uplink, the radio network controller 110 receives multiple frames from the wireless unit 115.

Using the frame selector 138, the radio network controller 110 performs the frame selection which involves selecting the frame with the best quality among the received frames. If at least one frame from all the different legs of a call in soft-handoff arrives within without an error, the radio network controller 110 forwards that frame in the high-speed wireless data network 120.

According to one illustrative embodiment of the present invention, the first base station 105(1) may comprise a controller 140 that controls transmit power of a transmitter at the first base station 105(1). The controller 140 may be suitably implemented in any number of ways using hardware, software, or a combination thereof. Specifically, the controller 140 may detect an indication of error 145 in arrival of a plurality of consecutive traffic frames 150 over the reverse links 125(1-m) from the wireless unit 115 when the call is in soft handoff. In response to detecting the indication of error 145, the controller 140 may cause the first base station 105(1) to change the transmit power of the forward link 130 from the first base station 105(1).

Accordingly, the controller 140 may perform reverse link error detection after frame selection. The controller 140 may use the detected error to boost the transmit power, correcting a link imbalance situation. The controller 140 may evaluate whether the transmit power boost is effective, i.e., whether a leg with a relatively low power legs is a dominant leg. If the controller 140 determines that the transmit power boost is indeed effective, the controller 140 may continue with boosting the transmit power of the first base station 105(1). Otherwise, the controller 140 may apply a down bias to the first base station 105(1), causing the boosting of the transmit power to stop and reduce the boosted transmit power to an original level.

For example, the received frames from all the base stations in an active set may be examined. If at least one of the base stations receives an error-free frame, the frame selector 138 indicates receipt of a frame without an error. As long as, at least one of the first and the second base stations 105(1-k) receives such a frame, the controller 140 may not reduce power imbalance across forward and reverse links.

However, in the case where the consecutive frames 150 are indicated to be in error by the frame selector 138 over the reverse links (1-m), then each base station of the first and the second base stations 105(1-k) may boost transmit power thereof to determine whether a dominant leg(s) belongs to that base station. In most scenarios, a base station with an imbalanced leg may boost the transmit power to a desired level because a down bias may have been applied earlier to that base station.

By selectively boosting the transmit power, the controller 140 may reduce the link imbalance based on whether a first leg 155(1) associated with the forward link 130(1) provides a relatively strong forward link to the wireless unit 115 from the first base station 105(1) relative to a second leg 155(2) associated with the reverse link 125(1) to the first base station 105(1) from the wireless unit 115 that may be a weak reverse link. However, all the first legs in soft handoff send messages to the wireless unit 115 synchronously, in one embodiment.

Accordingly, the controller 140 may significantly decrease a call drop rate while increasing capacity of radio frequency (RF) transmission in the spread spectrum wireless communications system 100. As used herein, the term "capacity of RF transmission" refers to availability of one or more radio resources, such as transmit power, that may be used to form wireless communications links including the reverse link 125(1) and the forward link 130, as well as the various features that may be provided to the wireless unit 115 and other wireless units by the first base station 105(1).

For example, the controller 140 may enable the first base station 105(1) to reduce a call drop rate and increase RF transmission capacity. However, persons of ordinary skill in the art having benefit of the present disclosure should appreciate that the present invention is not limited to the call drop rate and the RF transmission capacity. In alternative embodiments, the controller 140 may enable the first and second base stations 105(1-k) to provide different capabilities and/or additional capabilities.

Figure 2:
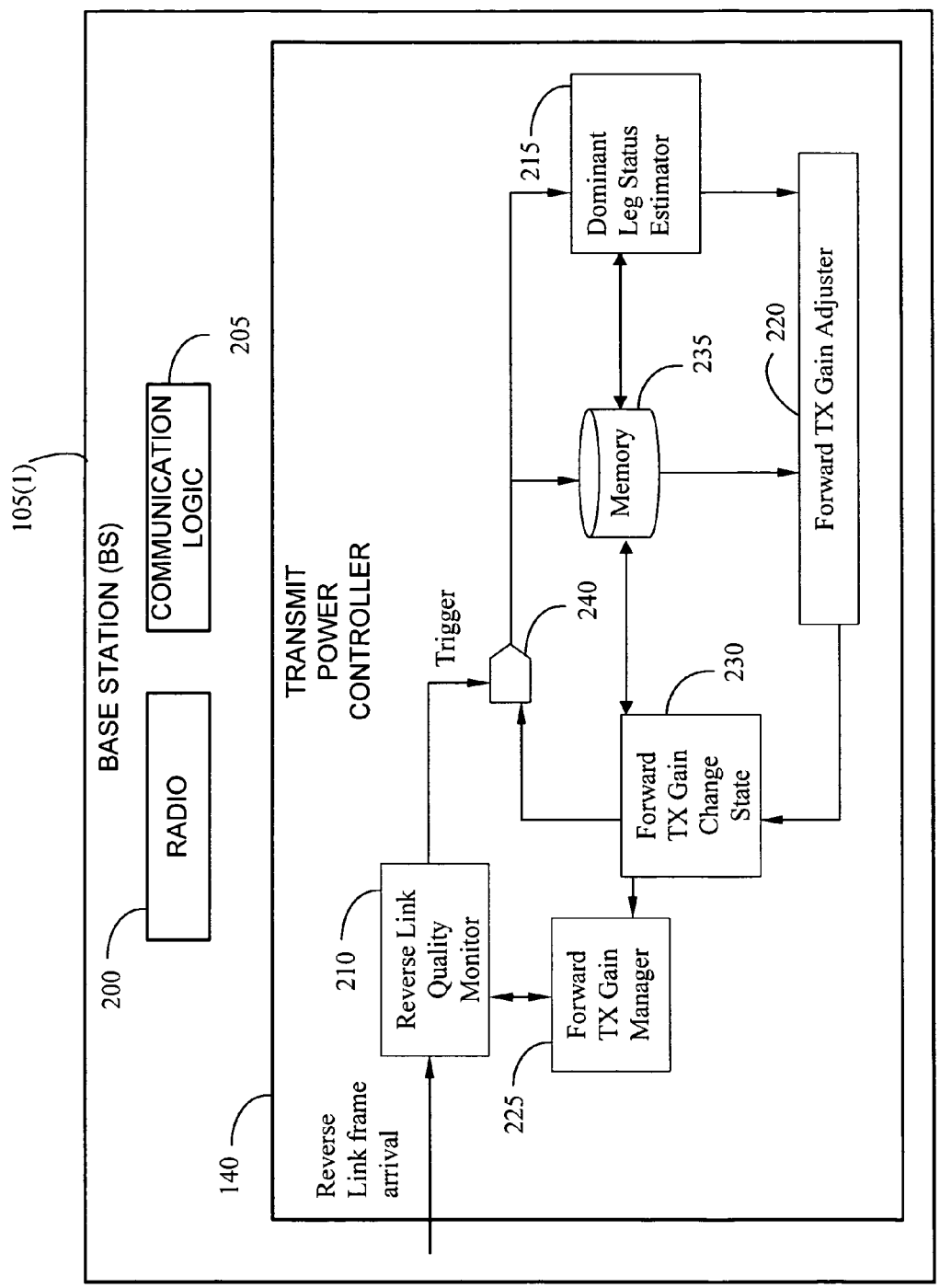
FIG. 2 schematically depicts the first base station that includes the controller shown in FIG. 1 in accordance with one illustrative embodiment of the present invention.

Referring to FIG. 2, the first base station 105(1) is depicted to include the controller 140 shown in FIG. 1 in accordance with one illustrative embodiment of the present invention. The first base station 105(1) comprises a conventional radio 200 coupled to a communication logic 205 that enable the controller 140 to form wireless communication links including the reverse link 125(1) with the wireless unit 115 and the forward link 130 thereto. In one embodiment, the reverse link 125(1) and the forward link 130 may be established on a plurality of channels. The channels, such as traffic and control channels may be associated with separate channel frequencies. For example, CDMA channels with associated channel number and frequency may form a wireless communication link for transmission of high-speed data.

The controller 140 may comprise a monitor 210 to monitor the arrival of the plurality of consecutive traffic frames 150 on the reverse link 125(1). The controller 140 may further comprise an estimator 215 at the first base station 105(1) to estimate status of a dominant leg that enables detection of the wireless unit 115 on the forward link 130. To adjust gain of traffic on the forward link 130, the controller 140 may include an adjuster 220. A manager 225 at the controller 140 may manage a change in a state 230 of the gain of traffic on the forward link 130. A storage device, such as a memory 235 may be coupled to the monitor 210, the estimator 215, the adjuster 220, and the manager 225 in the controller 140. Upon the indication of error 145 in arrival of the traffic frames 150, the controller 140 use a trigger 240 that initiates estimation of the status of the dominant leg.

Figure 3:
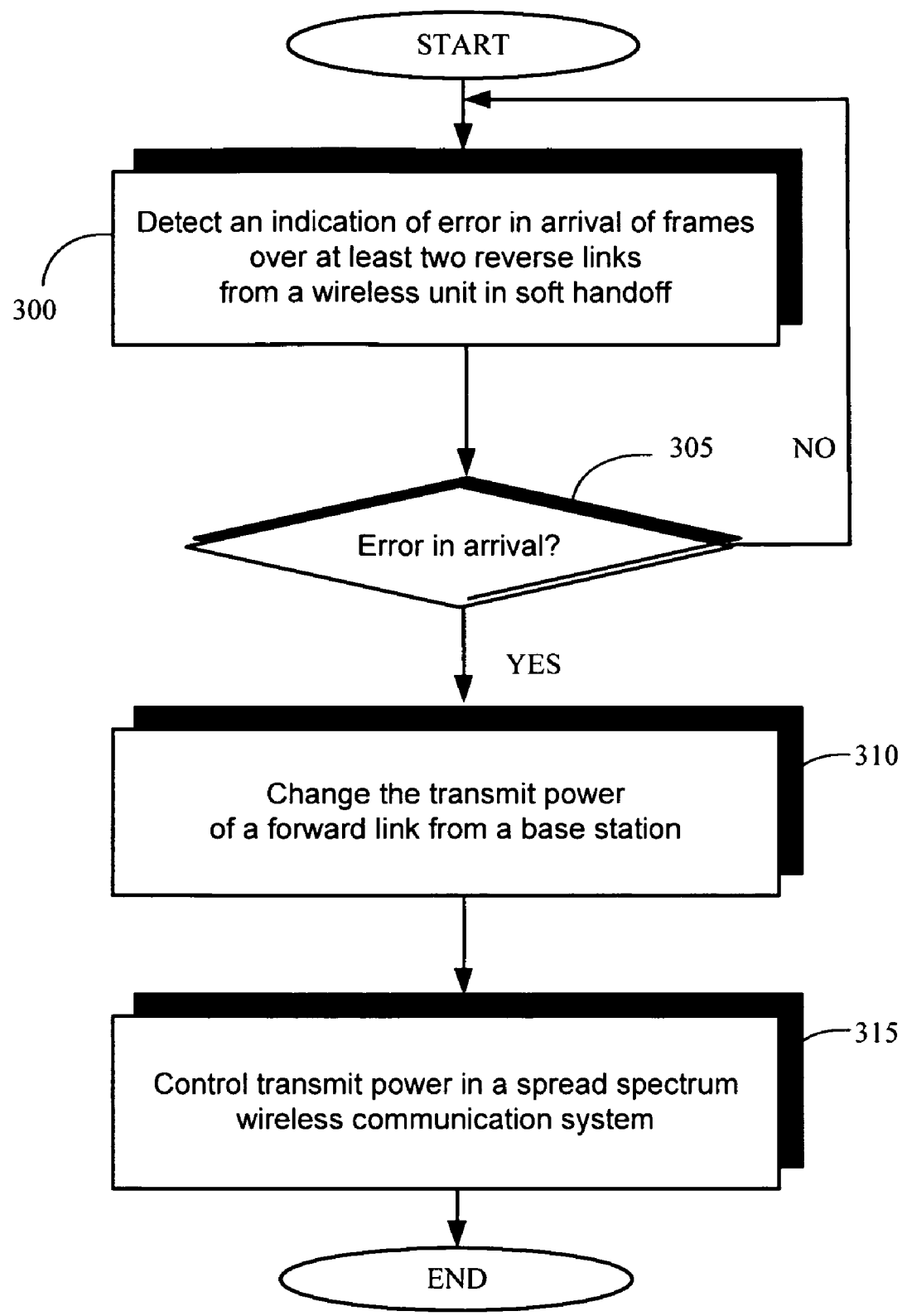
FIG. 3 illustrates a stylized representation of a method for controlling transmission power in the spread spectrum wireless communication system shown in Figure according to one embodiment of the present invention.

Turning now to FIG. 3, a stylized representation of a method is illustrated for controlling transmission power in the spread spectrum wireless communication system 100, as shown in FIG. 1, according to one embodiment of the present invention. In soft handoff, the radio network controller 110 may perform frame selection using the frame selector 138 on the plurality of consecutive traffic frames 150 received at the first and second base stations 105(1-k) over the reverse links 125(1-m) from the wireless unit 115. At block 300, the controller 140 may detect the indication of error 145 in arrival of the plurality of consecutive traffic frames 150 to control transmit power of a forward link 130 among the first forward link 130(1) to the first base station 105(1) and the second forward link 130(m) to the second base station 105(k).

A check at a decision block 305, may determine whether an error is indicated in arrival of the traffic frames 150 at the first base station 105(1). The controller 140 may change the transmit power of the forward link 130(1) from the first base station 105(1) in response to detecting the indication of error 145 at block 310. In this way, transmit power in the spread spectrum wireless communication system 100 may be controlled at block 315.

Figure 4:
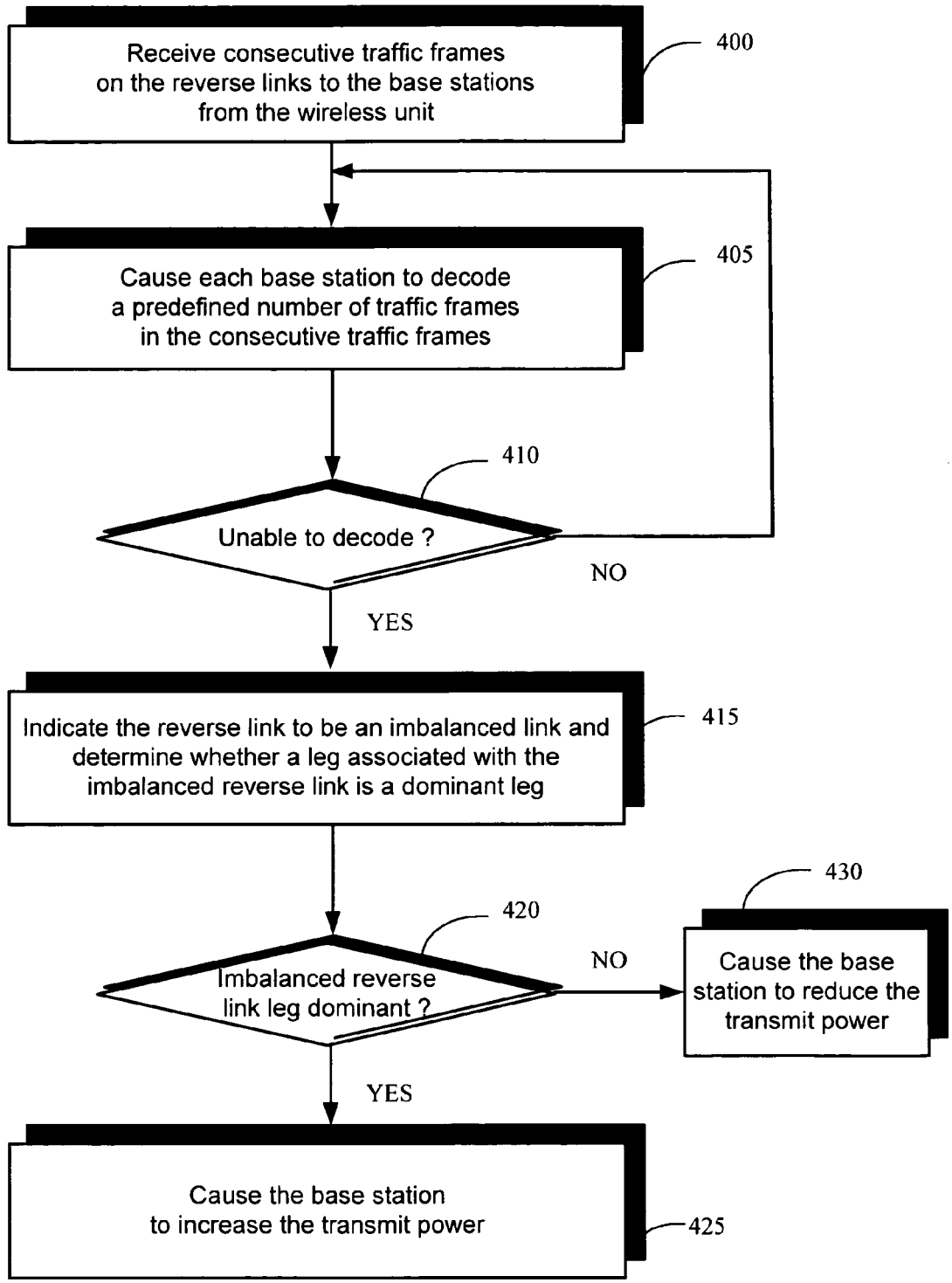
FIG. 4 illustrates a stylized representation of the method for controlling the transmit power of the forward link from the first base station shown in FIG. 2 according to one illustrative embodiment of the present invention.

Finally, FIG. 4 illustrates a stylized representation of the method controlling the transmit power of the forward link 130(1) from the first base station 105(1) shown in FIG. 2 according to one illustrative embodiment of the present invention. At block 400, the first base station 105(1) may receive the plurality of consecutive traffic frames 150 with a reverse pilot on the reverse links 125(1-m) from the wireless unit 115. The controller 140 may cause each base station in an active set, e.g., the first base station 105(1) to decode the arrived traffic frames. Specifically, as indicated in block 405, the controller 140 may determine whether a predefined number of traffic frames in the received plurality of consecutive traffic frames 150 may be correctly decoded. For example, four traffic frames in twelve consecutively received traffic frames may indicate an error in arrival of the received plurality of consecutive traffic frames 150. That is, in this example, upon arrival of more than three traffic frames, the controller 140 may detect the indication of error 145.

More specifically, IS-2000 standard specifies that the wireless unit 115 should turn off a local transmitter upon receipt of twelve consecutive frames in error. Therefore, when the controller 140 cannot decode (referred to as a bad reverse link) the traffic frame (which comes with a reverse pilot) over the reverse link 125(1), the wireless unit 115 may have turned off the local transmitter. In this case, if the leg with the bad reverse link is the dominant leg, the first base station 105(1) increases the transmit power. On the other hand, if this leg is determined not to be the dominant leg, the first base station 105(1) reduces the transmit power to maximize RF transmission capacity because this leg is not contributing much to the success of the forward link 130(1) and the first base station 105(1) has an inadequate reverse link.

To this end, a check, at a decision block 410, may ascertain whether the controller 140 is unable to decode the predefined number of traffic frames in the received plurality of consecutive traffic frames 150. If the controller 140 fails to decode as desired, at block 410, the reverse link 125(1) may be indicated to be an imbalanced link relative to the forward link 130 to the wireless unit 115 from the first base station 105(1). The controller 140 may determine whether a leg associated with the imbalanced reverse link is a dominant leg that enables detection of the wireless unit 115 on the forward link 130(1).

Another check at a decision block 420 may indicate whether the leg associated with the imbalanced reverse link is the dominant leg. If so, the controller 140 may cause the first base station 105(1) to increase the transmit power, as shown in block 425. That is, the controller 140 may increase the base station power by "X" decibels (dB) for "Y" number of frames when consecutive frames on the reverse link 125(1) may be received in error (or may not be detected). Conversely, if the leg associated with the imbalanced reverse link is determined not to be the dominant leg, the controller 140 may cause the first base station 105(1) to reduce the transmit power, as shown in block 430.

In one embodiment, to change the transmit power of the forward link 130 from the first base station 105(1), the controller 140 may detect whether a controlling leg that contributes to a success of a call is on the reverse link 125(1) or the forward link 130(1). If the controlling leg of the call is indicated to be on the reverse link 125(1), the controller 140 may cause the first base station 105(1) to decrease the transmit power for increasing a call drop rate while increasing a system capacity of radio frequency transmission. For example, the controller 140 may increase the transmit power of the first base station 105(1) by a desired amount for a predefined number of traffic frames in response to detecting the indication of error 145 for the plurality of consecutive traffic frames 150.

In response to increasing the transmit power of the first base station 105(1), the controller 140 uses the monitor 210 to monitor a quality of receipt, over the reverse link 125(1), for the plurality of consecutive traffic frames 150. After increasing the transmit power of the first base station 105(1) by a desired amount, the controller 140 may maintain a current transmit power level for the forward link 130(1) in response to receiving at least two traffic frames correctly. Upon receiving the plurality of traffic frames 150 incorrectly after the transmit power of the first base station 105(1) is increased by a desired amount, the controller 140 may reduce the transmit power of the controller 140 may until reaching a given minimum gain. For example, the controller 140 may apply a down bias to the controlling leg of the call on the reverse link 125(1).

However, if the controlling leg of the call happens to be on the forward link 130(1), the controller may cause the first base station 105(1) to increase the transmit power. In one embodiment, the controller 140 may reduce probability of applying a down bias to the controlling leg of the call on the forward link 130(1). The controller 140 may decrease a call drop rate while increasing the system capacity of radio frequency transmission in the spread spectrum wireless communications system 100.

By monitoring the frame quality on the reverse link 25(1) after the controller 140 increases the transmit power, e.g., if two or three correct frames are received after the transmit power increases, the first base station 105(1) may maintain the current transmit power level. If no correct frames are received after the transmit power increases, the controller 140 reduces the transmit power until a minimum gain level is reached for improving a call drop rate in a CDMA 3G1X system using a 3G1X power control while maximizing RF transmission capacity for the high-speed wireless data network 120.

In one embodiment, the high-speed wireless data network 120 may wirelessly communicate mobile data at a speed and coverage desired by individual users or enterprises. According to one embodiment, the high-speed wireless data network 120 may comprise one or more data networks, such an Internet Protocol (IP) network comprising the Internet and a public telephone system (PSTN). The 3rd generation (3G) mobile communication system, namely Universal Mobile Telecommunication System (UMTS) supports multimedia services according to 3rd Generation Partnership Project (3GPP) specifications. The UMTS also referred as Wideband Code Division Multiple Access (WCDMA) includes Core Networks (CN) that is packet switched networks, e.g., IP-based networks. Because of the merging of Internet and mobile applications, the UMTS users can access both telecommunications and Internet resources. To provide an end-to-end service to users, a UMTS network may deploy a UMTS bearer service layered architecture specified by Third Generation Project Partnership (3GPP) standard. The provision of the end-to-end service is conveyed over several networks and realized by the interaction of the protocol layers.

Portions of the present invention and corresponding detailed description are presented in terms of software, or algorithms and symbolic representations of operations on data bits within a computer memory. These descriptions and representations are the ones by which those of ordinary skill in the art effectively convey the substance of their work to others of ordinary skill in the art. An algorithm, as the term is used here, and as it is used generally, is conceived to be a self-consistent sequence of steps leading to a desired result. The steps are those requiring physical manipulations of physical quantities. Usually, though not necessarily, these quantities take the form of optical, electrical, or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, or as is apparent from the discussion, terms such as "processing" or "computing" or "calculating" or "determining" or "displaying" or the like, refer to the action and processes of a computer system, or similar electronic computing device, that manipulates and transforms data represented as physical, electronic quantities within the computer system's registers and memories into other data similarly represented as physical quantities within the computer system memories or registers or other such information storage, transmission or display devices.

Note also that the software implemented aspects of the invention are typically encoded on some form of program storage medium or implemented over some type of transmission medium. The program storage medium may be magnetic (e.g., a floppy disk or a hard drive) or optical (e.g., a compact disk read only memory, or "CD ROM"), and may be read only or random access. Similarly, the transmission medium may be twisted wire pairs, coaxial cable, optical fiber, or some other suitable transmission medium known to the art. The invention is not limited by these aspects of any given implementation.

The present invention set forth above is described with reference to the attached figures. Various structures, systems and devices are schematically depicted in the drawings for purposes of explanation only and so as to not obscure the present invention with details that are well known to those skilled in the art. Nevertheless, the attached drawings are included to describe and explain illustrative examples of the present invention. The words and phrases used herein should be understood and interpreted to have a meaning consistent with the understanding of those words and phrases by those skilled in the relevant art. No special definition of a term or phrase, i.e., a definition that is different from the ordinary and customary meaning as understood by those skilled in the art, is intended to be implied by consistent usage of the term or phrase herein. To the extent that a term or phrase is intended to have a special meaning, i.e., a meaning other than that understood by skilled artisans, such a special definition will be expressly set forth in the specification in a definitional manner that directly and unequivocally provides the special definition for the term or phrase.

While the invention has been illustrated herein as being useful in a telecommunications network environment, it also has application in other connected environments. For example, two or more of the devices described above may be coupled together via device-to-device connections, such as by hard cabling, radio frequency signals (e.g., 802.11(a), 802.11(b), 802.11(g), Bluetooth, or the like), infrared coupling, telephone lines and modems, or the like. The present invention may have application in any environment where two or more users are interconnected and capable of communicating with one another.

Those skilled in the art will appreciate that the various system layers, routines, or modules illustrated in the various embodiments herein may be executable control units. The control units may include a microprocessor, a microcontroller, a digital signal processor, a processor card (including one or more microprocessors or controllers), or other control or computing devices as well as executable instructions contained within one or more storage devices. The storage devices may include one or more machine-readable storage media for storing data and instructions. The storage media may include different forms of memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy, removable disks; other magnetic media including tape; and optical media such as compact disks (CDs) or digital video disks (DVDs). Instructions that make up the various software layers, routines, or modules in the various systems may be stored in respective storage devices. The instructions, when executed by a respective control unit, cause the corresponding system to perform programmed acts.

The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

We claim:

1. A method of wireless communication with a wireless unit, the method being implemented in a first base station that is one of a plurality of base stations in soft handoff with the wireless unit and comprising:

increasing a transmit power for a forward link from the first base station to the wireless unit in response to detecting errors in a plurality of frames received over a reverse link from the wireless unit to the first base station;

maintaining the transmit power for the forward link in response to determining that the forward link is a dominant leg following the increase in the transmit power, wherein the dominant leg is relatively strong and contributes relatively more to the success of a forward link to the wireless unit than weaker legs from the other base stations in soft handoff; and decreasing the transmit power in response to determining that the forward link is not the dominant leg following the increase in the transmit power.

2. A method, as set forth in claim 1, wherein determining that the forward link is the dominant leg comprises successfully receiving a plurality of frames over the reverse link following the increase in the transmit power.

3. A method, as set forth in claim 2, wherein determining that the forward link is not the dominant leg comprises detecting an error in at least one frame received over the reverse link following the increase in the transmit power.

4. A method, as set forth in claim 3, wherein increasing the transmit power comprises increasing the transmit power by a selected number of decibels for a selected number of frames.

5. A method, as set forth in claim 4, wherein decreasing the transmit power in response to determining that the forward link is not the dominant leg comprises decreasing the transmit power until a minimum gain is reached.

6. A method of wireless communication involving a wireless unit in soft handoff with a plurality of base stations, the method comprising:

transmitting a plurality of frames from the wireless unit to the plurality of base stations over a corresponding plurality of reverse links;

receiving, at the wireless unit, at least one frame transmitted at an increased transmit power over at least one of a plurality of forward links from at least one of the plurality of base stations in response to said at least one of the plurality of base stations detecting errors in the plurality of frames received over a reverse link from the wireless unit;

receiving, at the wireless unit, at least one frame transmitted at the increased transmit power in response to said at least one of the plurality of base stations determining that its forward link is a dominant leg following the increase in the transmit power, wherein the dominant leg is relatively strong and contributes relatively more to the success of a forward link to the wireless unit than weaker legs from the other base stations in soft handoff; and receiving, at the wireless unit, at least one frame transmitted at the decreased transmit power in response to said at least one of the plurality of base stations determining that the forward link is not the dominant leg following the increase in the transmit power.

* * * * *